162-301 AU 223 FA BEST AVAILABLE COPY
MTR34 VP RE 6,258

E. A. L. ROBERTS.

Method of Increasing the Capacity of Oil-Wells.

No. RE 6,258. Reissued Jan. 26, 1875.

Fig. 2.

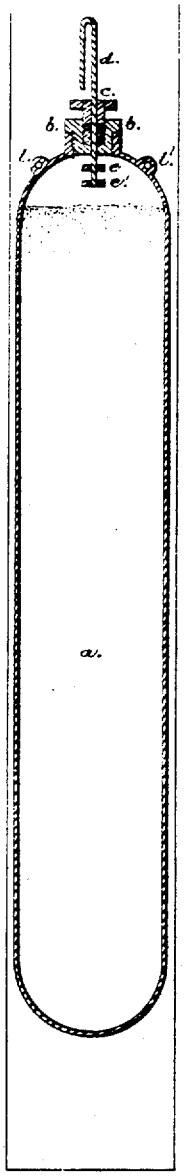

Fig. 3.

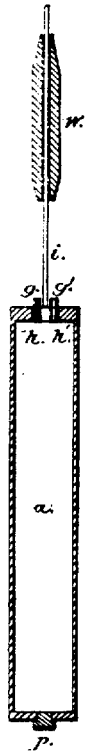

Fig. 1.

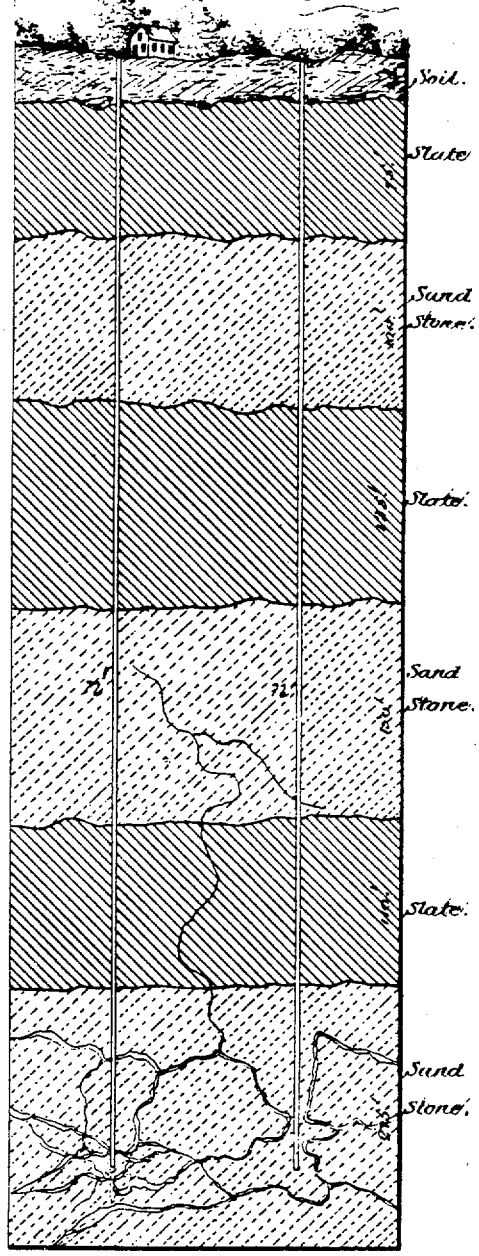

6,258. METHODS OF INCREASING THE CAPACITY OF OIL-WELLS. Edwd. A. L. Roberts, Titusville, Pa. Patent No. 59,986, dated Nov. 20, 1866; antedated May 20, 1866; reissue No. 5,434, dated June 3, 1873. [Filed Jan. 21, 1875.]

The method or process of increasing or restoring the productiveness of oil-wells by causing an explosion of gunpowder, or its equivalent, at or near the oil-bearing point, in connection with superincumbent fluid tamping, substantially as set forth.

W. Moore

Inventor:
E. A. L. Roberts, by his attys
Bakewell & Kerr.

THE GRAPHIC CO. PHOTO-LITH 39 & 41 PARK PLACE, N.Y.

BEST AVAILABLE COPY

Search R

UNITED STATES PATENT OFFICE.

EDWARD A. L. ROBERTS, OF TITUSVILLE, PENNSYLVANIA.

IMPROVEMENT IN METHODS OF INCREASING THE CAPACITY OF OIL-WELLS.

Specification forming part of Letters Patent No. 59,936, dated November 20, 1866; antedated May 20, 1866; reissue No. 5,434, dated June 3, 1873; reissue No. 6,258, dated January 26, 1875; application filed January 21, 1875.

*To all whom it may concern:*

Be it known that I, EDWARD A. L. ROBERTS, of the city of Titusville, in the county of Crawford and State of Pennsylvania, have invented a new and useful Improvement in Method of Increasing the Capacity of Oil-Wells, and of restoring oil-wells that have become clogged to productiveness. I do hereby declare the following to be a full, clear, and exact description thereof, reference being had to the accompanying drawings and the letters of reference marked thereon, making a part of this specification, a portion of which represent the apparatus used by me in working out my said invention.

The petroleum or oil taken from the oil-wells is, before it is removed, contained in seams, usually in the second or third stratums of sandstone or other rock abounding in the oil-regions, which are represented in Fig. 1 of the accompanying drawings.

Figure 1 represents a sectional view of the different stratums of rock usually found in oil-producing regions, and the seams or crevices containing the oil are represented by the irregular lines traversing the second and third stratums of sandstone-rock there shown. *n* and *n'* represent wells sunk into the rocks.

In order to take the oil from the seams or crevices in the rock, wells must be sunk which shall tap or intersect the seams, or some of them, containing the oil. The wells are frequently sunk to the depth of from eight hundred to nine hundred feet below the surface of the earth, and usually from three to six inches in diameter, and it frequently happens that a well will be sunk for a great distance into or through the rock containing the oil without tapping or passing through any of the seams in which it is contained, as shown by the course of the well *n* in Fig. 1. When this happens to be the case, the well is sometimes made available by increasing its diameter until it strikes some of the seams. This is done by boring from the top all the way down into the stratum of rock containing the oil, and is attended with nearly as much labor and expense as boring the well in the first instance. It also frequently happens that the seam intersected by the well is very small, or that the aperture into the well from the seam is very small, in either of which cases it is very liable to become clogged or stopped up during the working of the well, by substances contained therein, which prevents the oil from flowing or being sucked into the well. These stoppages are removed sometimes by enlarging the diameter of the well, as before stated, and sometimes, when the difficulty is slight, by forcing air down to or near the bottom of the well, and allowing it suddenly to escape. It is desirable, in order to increase the productiveness of oil-wells, as well as to prevent stoppages from obstructions, to have the well tap or connect with as many of the seams or crevices of the rock containing the oil as possible. The capacity of wells as at present constructed to tap or intersect seams is limited by the circumference of the well.

In my improved method of increasing the capacity of oil-wells, I fracture the rock containing the oil to some distance around the wells, thus creating artificial seams, and enabling me to connect the well thereby with seams containing the oil that would not have been otherwise reached by the well, and also to enlarge the aperture into any seam that might have been tapped by the well, and this I accomplish as follows: When the well is bored in the usual manner to a sufficient depth, I sink a flask containing gunpowder, or other powerful explosive material or gas, down the well, until it reaches the bottom of the well, or that portion of it which passes through the oil-bearing rock. When the flask has reached this position, if the well above should not be filled with water when the flask is let down, (which will almost always be the case unless it has been pumped out,) it is then to be filled up before the contents of the flask are ignited. The column of water then above the flask will be of so great gravity as to confine the effect of the explosion to the rock in the immediate vicinity of the flask, without materially affecting the stratums of rock above, and I make use of it for that purpose. I then ignite the contents of the flask by means of fulminating-powder, electricity, or other

BEST AVAILABLE COPY means used to explode shells, torpedoes, or cartridges under water, and the explosion which thereupon takes place fractures the oil-bearing rock, opens the seams therein, and connects them with the wells, and when the seams leading into a well have become stopped by substances getting into the seams, and closing it, so as to prevent the oil from flowing or being sucked into the well, as before described, such stoppages may be removed more readily by the aid of an explosion produced in the vicinity of the stoppage than can be done by any means now in use.

In order more fully to explain my method of working, I will describe the apparatus I use.

Fig. 2 represents a sectional view of the hollow flask, made of iron, glass, or other material, and filled with gunpowder or other explosive material or gas, with a cover and means of letting the same down into the well and exploding the contents.

Letter *a* is the body of the flask containing the powder or other explosive materials. *b* is a cover screwing down on the top of the flask, water-tight, and covering the hole through which the powder is introduced. *l l'* are two small lugs placed at or near the top of the flask, and on opposite sides of the cover, into which lugs cords are fastened to assist in letting the flask down into the well, and in removing it if, for any reason, the contents should not explode. *c* is a stuffing-box or gland, through which the cord or wire *d* passes, which connects at one end with a small quantity of fulminating-powder upon the disks *e* and *e'* on that end of the wire in the interior of the flask, and at the other end with a cord extending out of the top of the well, and sufficiently strong to enable the operator to pull the wire *d* through the stuffing-box *c* with sufficient force to ignite the fulminating-powder on the disks *e e'* on the end of the wire *d*, which will readily ignite the powder in the flask *a*.

If electricity is used to ignite the contents of the flask, the wires can pass through the stuffing-box *c* in the same manner as the wire *d*; or the contents of the flask may be ignited by means of the arrangement shown at Fig. 3, in which *a* represents the flask. *g* and *g'* are percussion-caps fitting upon the top of the hollow nipples *h* and *h'* on the top of the flask, connecting with the powder on the inside, and placed near together on opposite sides and equidistant from the wire *i*, which is connected with the top of the flask in any manner convenient, and is used to assist in letting the flask down into or in raising it out of the well, and also to guide the weight *w* in its descent to the caps on the nipples. *w* is an oblong weight, made of any metal of sufficient gravity to fall rapidly through the water and heavy enough to explode the caps by the momentum given by falling down the well to the nipples, and of a little greater diameter at the bottom than the space between the tops of the two nipples, and with a hole running longitudinally through the center large enough to allow the wire *i* to pass easily through it, where the flask is in position.

The contents may be exploded by allowing the weight to slide down the wire to the caps, which will be exploded by the concussion and the contents of the flask thereby ignited. After the caps are put on the nipples they should be varnished, or other similar substance applied to them, to make the connection between them impervious to water.

In Fig. 3 the flask has no cover, but the powder is introduced through a hole in the bottom, which is stopped by the screw-plug *p*, which is made to fit water-tight.

I prefer to have the flask made of cast-iron or glass. It should be sufficiently strong to resist the pressure of the column of water which will be above it when sunk to the required depth, and made impervious to moisture. It should be a little less in diameter than the diameter of the bore of the well, in order to slide easily down the bore of the well through the water.

The length of the flask will depend upon the amount of force which may be required for the explosion, care being taken not to have it so great as to shatter or displace the sides of the well above the rock which it is desired to have opened by the explosion; to guard against which the flask should be somewhat shorter than the distance which the well extends into the oil-bearing rock.

Instead of the particular means above described by me for igniting the contents of the flask, any means used to explode shells, torpedoes, or cartridges under water may be employed for that purpose.

What I claim as my invention, and desire to secure by Letters Patent, is—

The method or process of increasing or restoring the productiveness of oil-wells by causing an explosion of gunpowder, or its equivalent, at or near the oil-bearing point, in connection with superincumbent fluid tamping, substantially as set forth.

In witness whereof I, the said EDWARD A. L. ROBERTS, have hereunto set my hand.

EDWARD A. L. ROBERTS.

Witnesses:

T. B. KERR,

W. BAKEWELL.